US009386527B2

(12) United States Patent
Shana'a et al.

(10) Patent No.: US 9,386,527 B2
(45) Date of Patent: Jul. 5, 2016

(54) PROXIMITY SENSING METHOD USING LOOPBACK MECHANISM AND WIRELESS COMMUNICATIONS DEVICE THEREOF

(71) Applicant: MediaTek Singapore Pte. Ltd., Singapore (SG)

(72) Inventors: Osama K A Shana'a, Singapore (SG); Wee-Liang Lien, Singapore (SG); Eng-Chuan Low, Singapore (SG); Chin-Heng Leow, Singapore (SG); Tieng Ying Choke, Singapore (SG); Yuan Sun, Singapore (SG)

(73) Assignee: MediaTek Singapore Pte. Ltd., Singapore (SG)

(*) Notice: Subject to any disclaimer, the term of this patent is extended or adjusted under 35 U.S.C. 154(b) by 262 days.

(21) Appl. No.: 14/058,305

(22) Filed: Oct. 21, 2013

(65) Prior Publication Data

US 2014/0194057 A1    Jul. 10, 2014

Related U.S. Application Data

(60) Provisional application No. 61/748,764, filed on Jan. 4, 2013.

(51) Int. Cl.
*H04B 5/02*    (2006.01)
*H04W 52/02*   (2009.01)

(52) U.S. Cl.
CPC ...... *H04W 52/0241* (2013.01); *H04W 52/0245* (2013.01); *H04W 52/0254* (2013.01)

(58) Field of Classification Search
CPC ... H01Q 1/2216; H04W 4/008; H04B 5/0068; H04B 5/0075; H04B 5/02; H04M 2203/2094
USPC ................... 455/41.1, 41.2; 235/439
See application file for complete search history.

(56) References Cited

U.S. PATENT DOCUMENTS

| 5,365,516 A * | 11/1994 | Jandrell ............... G01S 5/0009 340/991 |
| 6,905,074 B2 * | 6/2005 | Charrat ............... G06K 7/0008 235/492 |
| 2010/0144269 A1 * | 6/2010 | Do ..................... G06K 7/0008 455/41.1 |
| 2010/0282849 A1 * | 11/2010 | Mair .................. G06K 7/10128 235/439 |
| 2013/0122813 A1 * | 5/2013 | Finkenzeller ....... G06K 7/0008 455/41.2 |

* cited by examiner

*Primary Examiner* — Edward Urban
*Assistant Examiner* — Max Mathew
(74) *Attorney, Agent, or Firm* — Winston Hsu; Scott Margo

(57) ABSTRACT

A proximity sensing method employed by a wireless communications device includes the steps of: performing a first predetermined operation to detect a presence of at least a transponder in the proximity of the wireless communications device; when the presence of a transponder in the proximity of the wireless communications device is not detected by the first predetermined operation, performing a second predetermined operation to obtain a first characteristic value and after a period of time, performing the second predetermined operation to obtain a second characteristic value sequentially; checking if the first characteristic value and the second characteristic value satisfy a predetermined criteria; and when the predetermined criterion is satisfied, performing the first predetermined operation again to check the presence of the transponder in the proximity of the wireless communications device.

18 Claims, 5 Drawing Sheets

PROXIMITY SENSING METHOD USING LOOPBACK MECHANISM AND WIRELESS COMMUNICATIONS DEVICE THEREOF

CROSS REFERENCE TO RELATED APPLICATIONS

This application claims the benefit of U.S. Provisional Application No. 61/748,764 (filed Jan. 4, 2013). The entire content of this related application is incorporated herein by reference.

BACKGROUND

Near field communication, or NFC, is a set of short-range wireless technologies, typically requiring a distance of 4 cm or less. NFC generally operates at 13.56 MHz and at rates ranging typically from about 106 kbits/s to 848 kbits/s. NFC requires that NFC devices be present within a relatively close proximity to each other so that their corresponding magnetic fields can couple and the devices can exchange information.

An NFC device is required to sense proximity of a target (usually a card) in order to initiate communication. One way to do this is for the NFC device to constantly initiate communications for all possible card types (A, B and F) until it receives a response. This approach has the disadvantage of draining the battery because of the continuous polling (tens of mA).

Therefore, there is a need for a better proximity sensing mechanism for an NFC device that does not drain the battery but can still detect any card which comes within its proximity.

SUMMARY

In accordance with exemplary embodiments of the present invention, a proximity sensing method using a loopback mechanism and a related wireless communications device are proposed to solve the above-mentioned problem.

According to a first aspect of the present invention, an exemplary proximity sensing method employed by a wireless communications device is disclosed. The exemplary proximity sensing method includes the steps of: performing a first predetermined operation to detect presence of transponder(s) in the proximity of the wireless communications device; when the presence of transponder (s) in the proximity of the wireless communications device is not detected by the first predetermined operation, performing a second predetermined operation to obtain a first characteristic value and after a period of time, performing the second predetermined operation to obtain a second characteristic value sequentially; checking if the first characteristic value and the second characteristic value satisfy a predetermined criteria; and when the predetermined criterion is satisfied, performing the first predetermined operation again to check the presence of the transponder in the proximity of the wireless communications device.

According to a second aspect of the present invention, a wireless communications device having proximity sensing capability is disclosed. The exemplary wireless communications device includes a first circuit and a second circuit. The first circuit is arranged for performing a first predetermined operation to detect the presence of transponder(s) in the proximity of the wireless communications device, and when the presence of transponder(s) in the proximity of the wireless communications device is not detected by the first predetermined operation, performing a second predetermined operation to obtain a first characteristic value and after a period of time, performing the second predetermined operation to obtain a second characteristic value sequentially. The second circuit is arranged for checking if the first characteristic value and the second characteristic value satisfy a predetermined criterion. When the predetermined criterion is satisfied, the first circuit performs the first predetermined operation again to check the presence of the transponder in the proximity of the wireless communications device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Conventionally, a first wireless communications device (a near field communications (NFC) reader) and a second wireless communications device (an NFC tag) operate in a conventional polling mode to establish communication. The first wireless communications device provides a polling command to the second wireless communications device. The second wireless communications device provides a response to the polling command. Since the first wireless communications device has no knowledge of the geographical location of the second wireless communications device, the first wireless communications device has to constantly perform the polling operation, which may drain the battery of the first wireless communications device.

The concept of the present invention is for the wireless communications device to have low power consumption. Instead of constantly polling for potential connection establishment, the wireless communications device only polls for connection establishment when it detects the presence of a transponder. The present invention proposes a low power consumption proximity sensing scheme for the first wireless communications device, to detect presence of the second wireless communications device in an operating distance of the first wireless communications device before the first wireless communications device performs the polling operation. Therefore, the present invention may optimize power consumption in the first wireless communication device and overcome the shortcomings described above. Further aspects and advantages of the present invention will become apparent from the following detailed description.

Figure 1A:
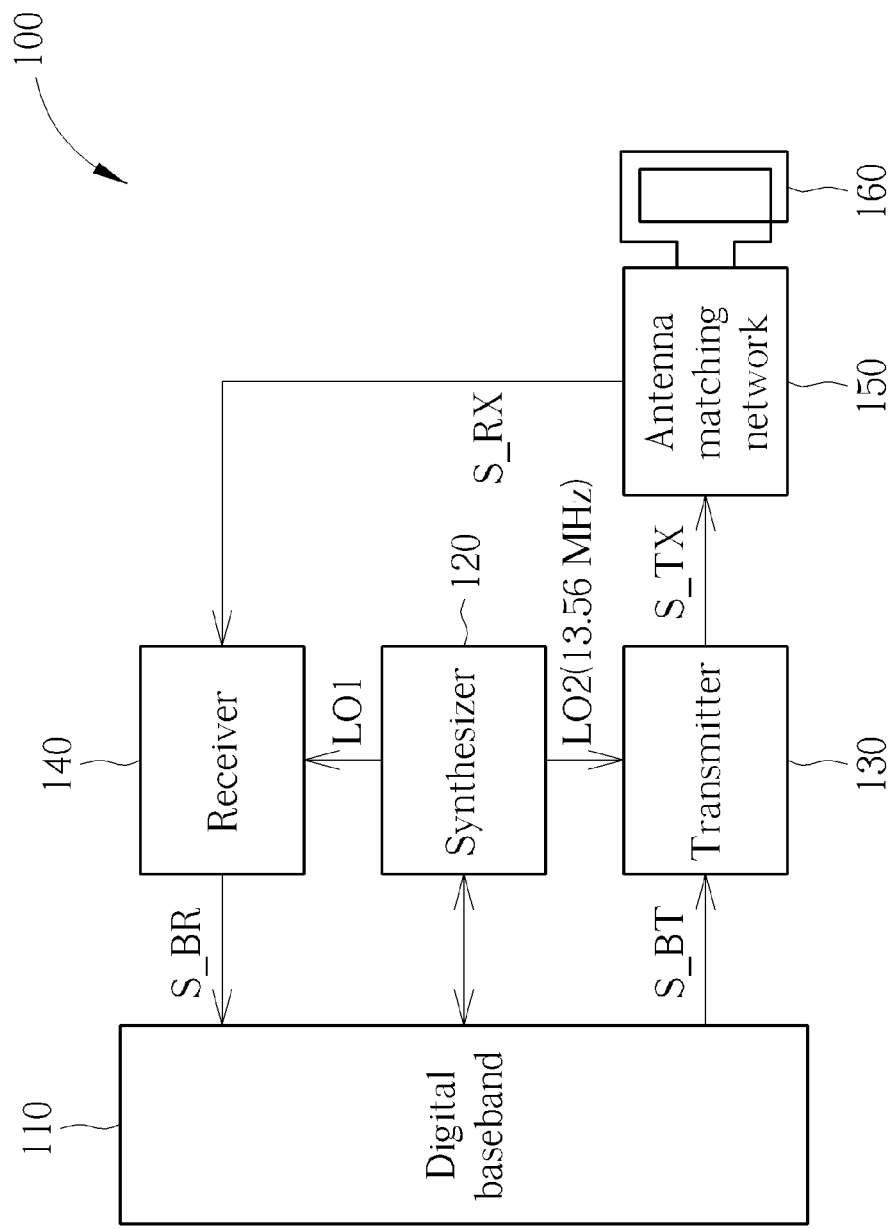
FIG. 1A is a block diagram of a wireless communication device according to an embodiment of the present invention.

Please refer to FIG. 1A, which is a block diagram of a wireless communication device 100 according to an embodiment of the present invention. The wireless communication device 100 may be an NFC device, such as a radio frequency identification (RFID) card. The wireless communication device 100 includes a digital baseband 110, a synthesizer 120, a transmitter 130, a receiver 140, an antenna 160 and an antenna matching network 150. The digital baseband 110 is arranged to issue a baseband transmission signal S_BT to the transmitter 130, and receive a baseband reception signal S_BR from the receiver 140. The synthesizer 120 includes a first local oscillator 130 and a second local oscillator 140. The first local oscillator 130 is arranged to generate a first local oscillation (LO) frequency LO1 to the receiver 140, and the second local oscillator 140 is arranged to generate a second LO frequency LO2 to the transmitter 130. The transmitter is arranged to generate a transmission signal S_TX according to the baseband transmission signal S_BT and the second LO frequency LO2, and transmit the transmission signal S_TX to the antenna matching network 150. The receiver 140 is arranged to receive a reception signal S_RX from the antenna matching network 150, generate the baseband reception signal S_BR according to the reception signal S_RX and the first LO frequency LO1, and send the baseband reception signal S_BR to the digital baseband 110. Please note that, in this embodiment, the reception signal S_RX uses the second LO frequency LO2 as its center frequency and further mixes the reception signal S_RX with the first LO frequency LO1 to obtain the baseband reception signal S_BR.

Figure 1B:
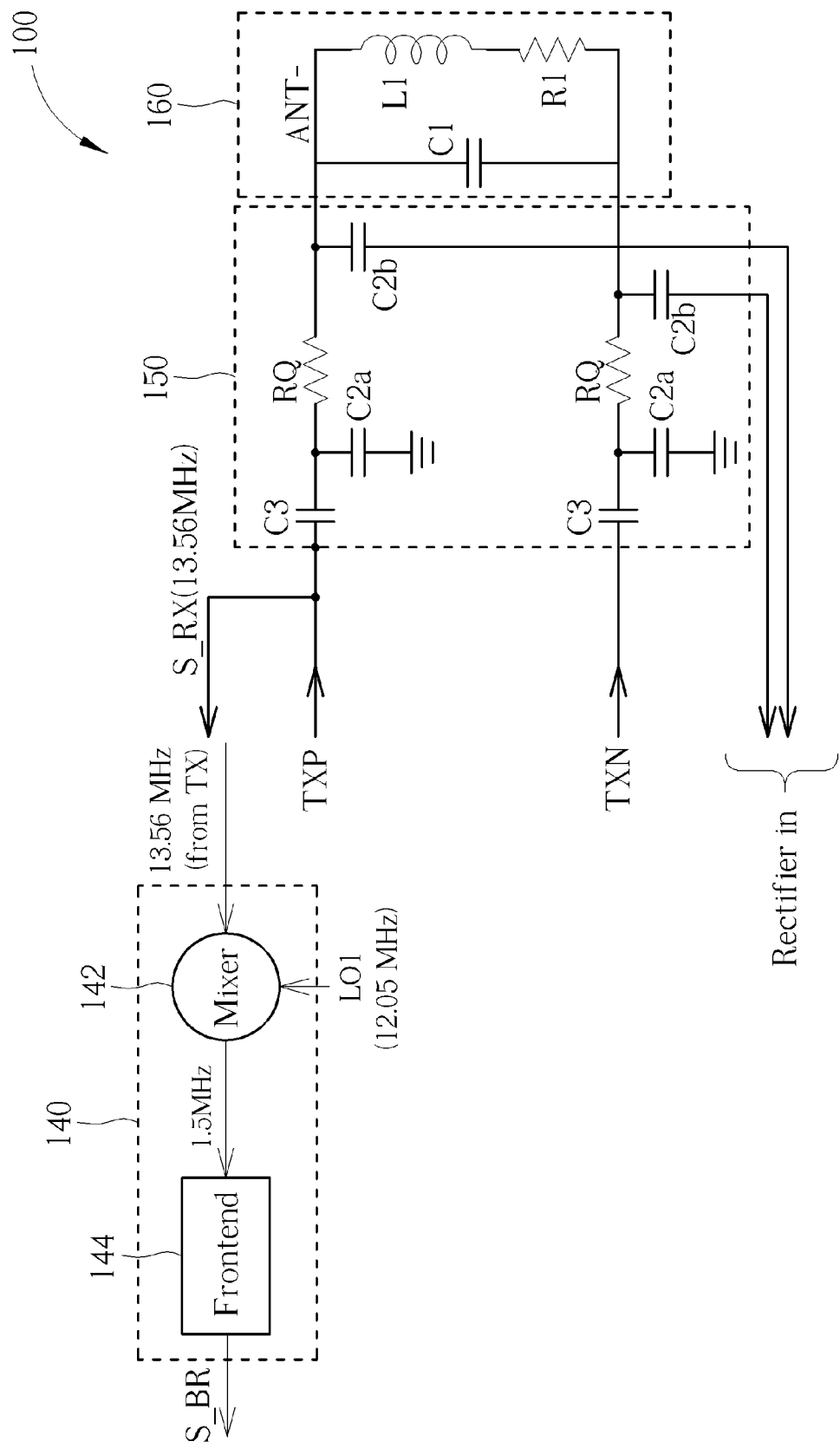
FIG. 1B is a schematic diagram of one possible implementation of the wireless communication device 100 according to an embodiment of the present invention.

Please refer to FIG. 1B, which is a schematic diagram of the wireless communication device 100 according to an embodiment of the present invention. In FIG. 1B, the antenna 160 includes a resistor R1, an inductance L1 and a capacitor C1. The inductance L1 is connected with the resistor R1 in series, and the capacitor C1 is coupled to the R1-L1 circuit in parallel. However, this is for illustrative purpose only, and not meant to be a limitation of the present invention. The value of each element of the antenna 160 may be changed according to different applications. As can be seen from FIG. 1B, the matching network 150 may include a pair of matching circuits, and each of the matching circuits may include a first capacitor C2b, a second capacitor C2a, a third capacitor C3, and a resistor RQ. Please note that the design of the matching network 150 is only for illustrative purpose only, and it not meant to be a limitation of the present invention. The matching circuits are coupled between the antenna 160 and the transmitter 130 (not shown), wherein one matching circuit is arranged for transmitting an output signal TXP of the transmitter 130 while the other matching circuit is arranged for transmitting the other output signal TXN of the transmitter 130. Here, TXN is differential transmit signal of TXP. In addition, the matching network 150 can be optionally coupled to a signal rectifier (not shown) via the pair of the first capacitors C2b. In addition, the receiver 140 includes a mixer 142 and a frontend 144. The mixer 142 mixes the first LO frequency LO1 and the second LO frequency LO2 in order to obtain the frequency of the baseband reception signal S_BR. In this embodiment, the first LO frequency LO1 may be 12.05 MHz, the second LO frequency LO2 is 13.26 MHz, and the frequency of the output of the mixer 142 is 15. MHz~1.5 MHz. The frontend 144 process the output of the mixer 142 and then passes the processed signal to the digital baseband 110.

Figure 1C:
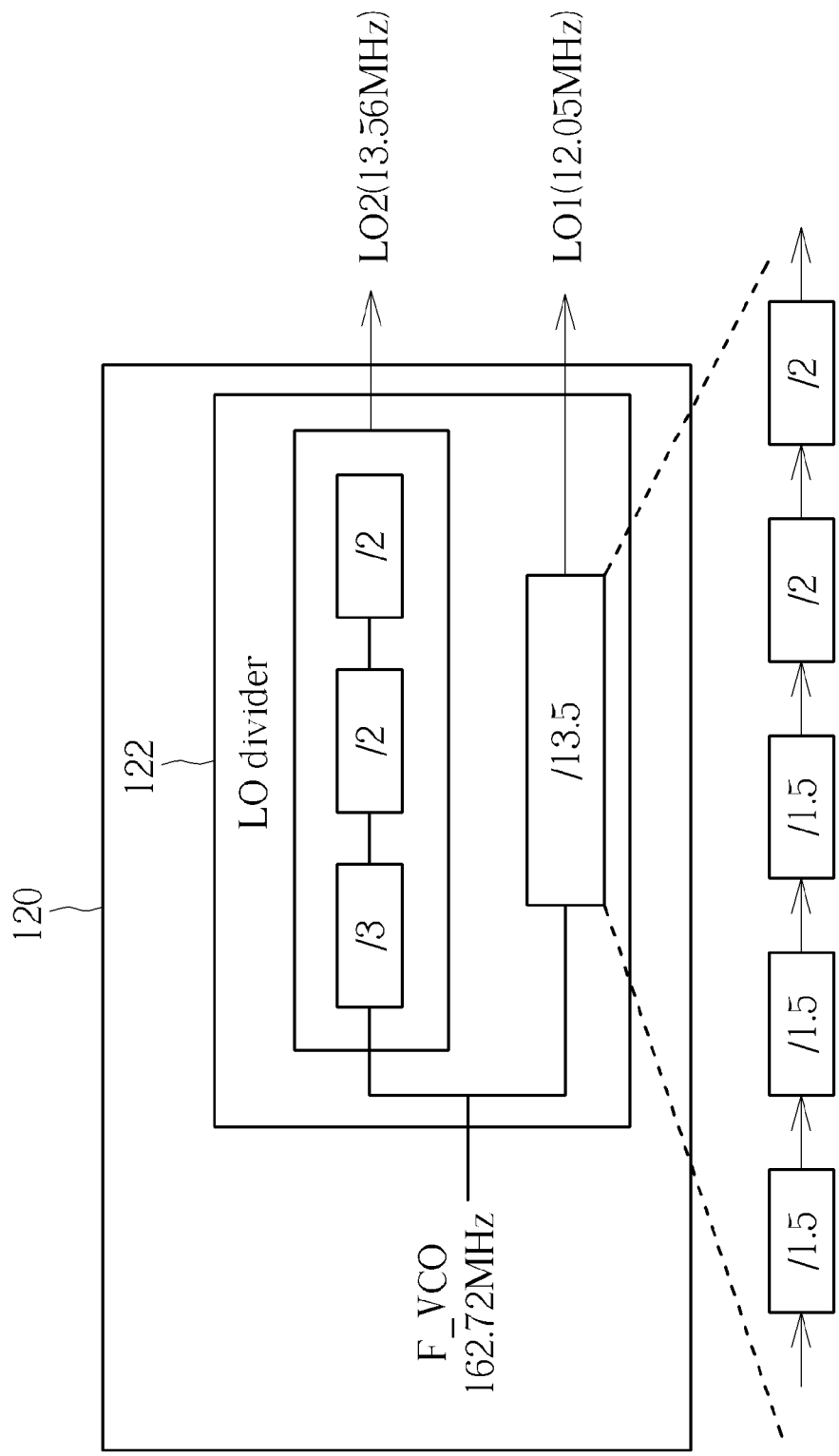
FIG. 1C is a schematic diagram of a dual local oscillation scheme according to an embodiment of the present invention

Please refer to FIG. 1C, which is a schematic diagram of a dual local oscillation scheme according to an embodiment of the present invention. As shown n FIG. 1C, the synthesizer 120 includes a LO divider 122. The LO divider 122 takes a frequency F_VCO as its input. In this embodiment, the frequency F_VCO is 162.72 MHz. The LO divider 122 divides the frequency F_VCO by 13.5 in order to obtain the first LO frequency LO1, and LO divider 122 divides the frequency F_VCO by 12 in order to obtain the second LO frequency LO2. As can be seen from FIG. 1C, the factor 13.5 can be derived from a series simple division.

Please note that the receiver architecture mentioned above is only one embodiment to the present invention. The present invention is not limited to direct or low-IF receiver architectures. For different implementations, one may use other types of receiver architecture, such as direct-sampling receiver. For example, when using direct-sampling receiver, LO1 is the ADC sampling clock which can be any value higher than 13.56 MHz (can be 27.12 MHz or 54.24 MHJz, etc.).

It should be understood that, if a transponder appears in proximity to the wireless communication device 100, the antenna matching network 150 will detect the difference in electro-magnetic fields caused by the presence of the transponder. The transmission signal S_TX will also be affected by the presence of the transponder. The change in characteristics of the transmission signal S_TX may be regarded as an ambient factor which indicates "a change in antenna environment".

In this embodiment, the transmitter 130 first sends a polling command signal S_POLL to inquire if there is a potential connection establishment. If there is no response, the wireless communication device 100 enters a sensing loop where the ambient factor is periodically measured to monitor the change of surroundings; otherwise, the receiver will receive a response signal S_RES of the polling command signal S_POLL from a transponder, and the wireless communications device 100 will establish connection with the transponder. The ambient factor is measured as follows: the transmitter sends the transmission signal S_TX as a probe signal to the antenna matching network 150, and then the transmission signal S_TX loops back through the antenna matching network to the wireless communication device 100 where it is received by the receiver 140. The receiver 140 generates the baseband reception signal S_BR as a first ambient factor AF1. The first ambient factor AF1 is saved as a "no communication" level in the digital baseband 110. After a short period of time T1 (e.g. 0.5 second), the wireless communication device 100 measure the ambient factor again, and obtains a second ambient factor AF2. If the digital baseband 110 determines that the difference between the first ambient factor AF1 and the second ambient factor AF2 is smaller than a threshold TH, it indicates that no change occurs, and hence no transponder appears in the proximity to the wireless communication device 100. In this case, the sensing loop continues, and the wireless communication device 100 enters into a sleep mode for a period of time T2, wherein the measuring operation will be performed again after exiting the sleep mode. The wireless communication device 100 will keep measuring the ambient factor until the difference between the first ambient factor AF1 and the second ambient factor AF2 exceeds the threshold TH. Please note that the time period T1, T2 and the threshold TH are all programmable.

If the digital baseband 110 determines that the difference between the first ambient factor AF1 and the second ambient factor AF2 exceeds the threshold TH, this may suggest that some noticeable change occurs in the antenna environment, and hence there might be a transponder in proximity to the wireless communication device 100. The transmitter 130 will send another polling command signal S_POLL to inquire if there a potential connection establishment. If there is no response, the digital baseband 110 updates the first ambient factor AF1 with the second ambient factor AF2, and the sensing loop continues; otherwise, the receiver will receive a response signal S_RES of the polling command signal S_POLL from a transponder, and the wireless communications device 100 will establish connection with the transponder. That is, if there is no response, the wireless communication device 100 will enter into the sleep mode after updating the first ambient factor AF1, and perform the measuring operation after exiting the sleep mode.

Please note that, in this embodiment, the transmission signal S_TX can be a single-tone signal. For example, the transmission signal S_TX may be a single-tone signal whose frequency is 13.56 MHz if the wireless communication device 100 is a NFC device. Both the transmitter 130 and the receiver 140 have to be turned on for a short period of time in order to realize the signal loopback. Please note that the transmission signal S_TX is not necessary a single tone signal. For example, it can be a square wave signal with fundamental frequency of 13.56 MHz. In some cases, it can also be an arbitrary signal, a triangular signal or a white noise signal.

The operations of the above-mentioned wireless communications device can be summarized into a flowchart. Please refer to FIG. 2, which is a flowchart of a proximity sensing method employed by the wireless communications device 100. The exemplary proximity sensing method may be briefly summarized by the following steps.

Step 200: Start.

Step 201: Poll for potential connection. The polling operation can be a full looping of transmitting A, B, F and any NFC protocol to see if there is any response.

Step 202: Check if there is a response from a transponder. If yes, go to step 203; otherwise, go to step 204.

Step 203: Establish connection with the transponder. In a certain implementation, after establishing connection with transponder, the wireless communications device can enter into a sleep mode to save power, for example Step 208. It will wait for a period of time and then wake up to re-perform the polling operation as stated in Step 201 for another potential connection.

Step 204: Measure a first ambient factor.

Step 205: Wait for a period of time. The waiting action can be implemented as entering a sleep mode. In other words, the wireless communications device will enter into a sleep mode after obtaining the first ambient factor to save power. It will then leave the sleep mode for Step 206 after the period of time.

Step 206: Measure a second ambient factor.

Step 207: Check if the difference between the first ambient factor and the second ambient factor exceeds a threshold. If yes, go to step 209; otherwise, go back to step 205.

Step 208: Wait for a period of time, go to step 201.

Step 209: Poll for potential connection. The polling operation can be a full looping of transmitting A, B, F and any NFC protocol to see if there is any response.

Step 210: Check if there is a response from a transponder. If yes, go to step 211; otherwise, go to step 212.

Step 212: Update the first ambient factor. In a certain implementation, after the update, it can go back to step 205, where it will wait for a period of time by entering into a sleep mode.

Figure 2:
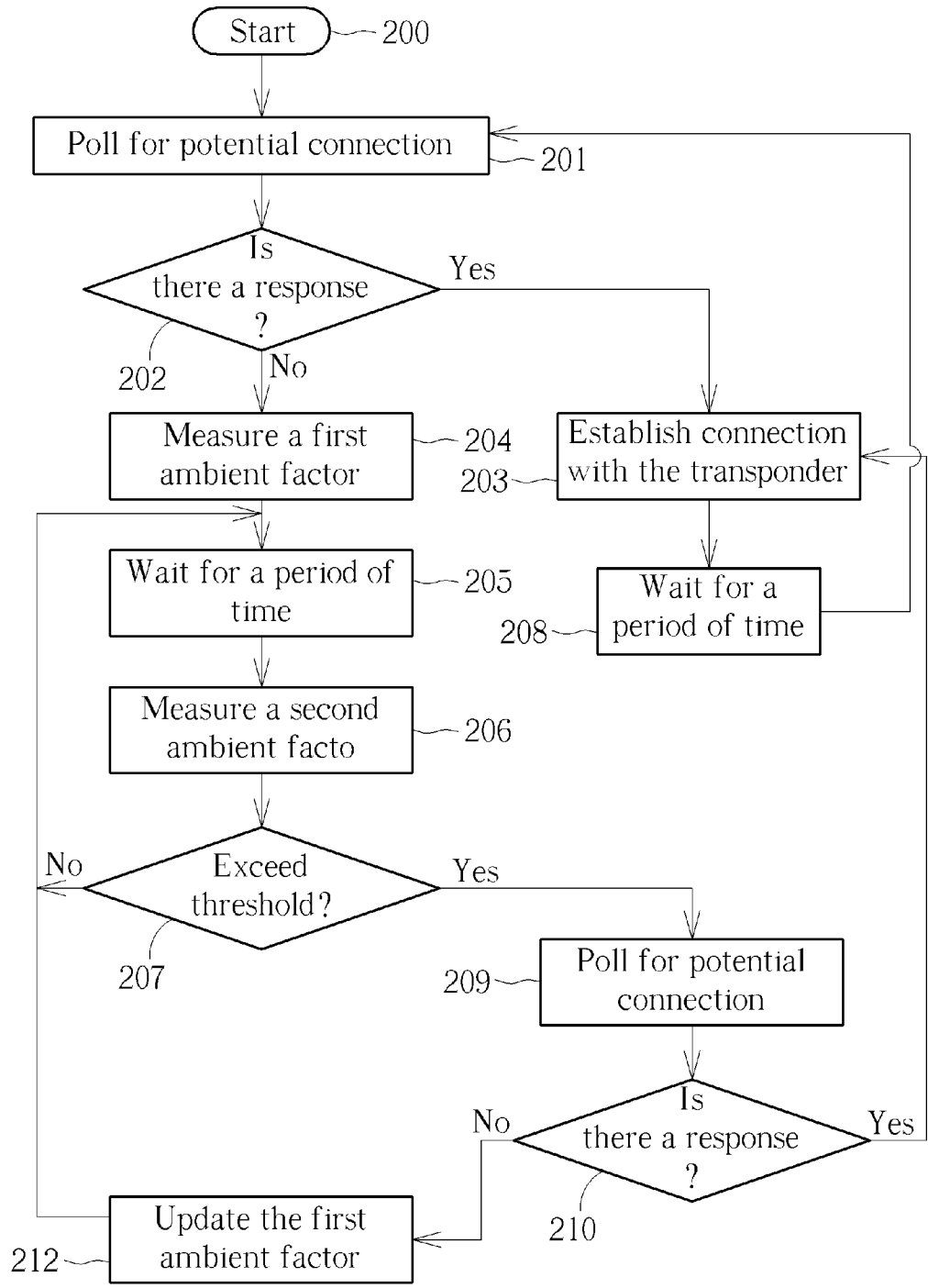
FIG. 2 is a flowchart of a proximity sensing method employed by the wireless communications device.

As a person skilled in the art can readily understand the operation of each step shown in FIG. 2 after reading the above paragraphs, further description is omitted here for brevity.

Figure 3:
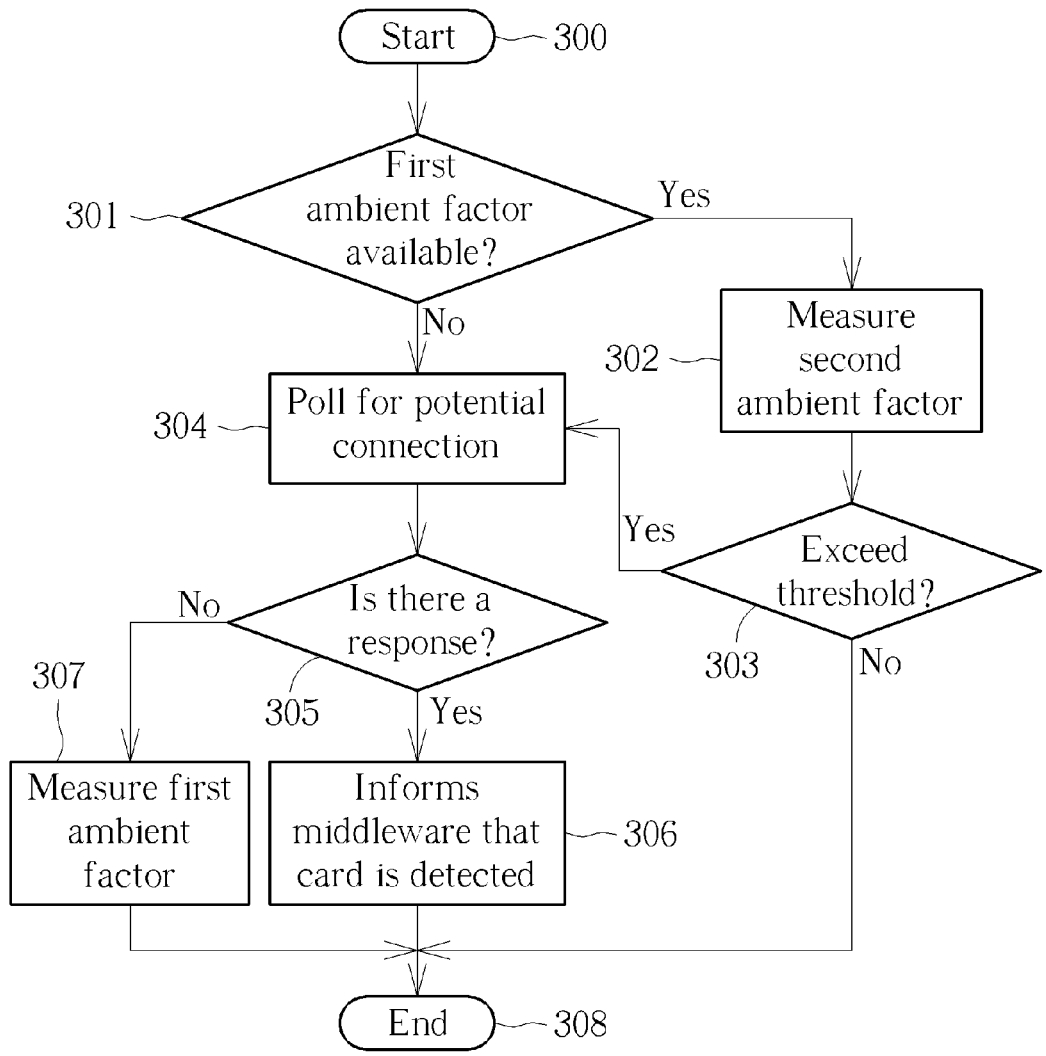
FIG. 3 is another flowchart of a proximity sensing method employed by the wireless communications device.

Please note that, provided that the result is substantially the same, the steps are not required to be executed in the exact order shown in FIG. 2. For example, in another embodiment, the exemplary proximity sensing method may be summarized into another flowchart where the step of polling for potential connection is taking place after the step of measuring the first and/or second ambient factor. Please refer to FIG. 3, which is another flowchart of a proximity sensing method employed by the wireless communications device 100. The exemplary proximity sensing method may be briefly summarized by the following steps.

Step 300: Start.

Step 301: Check if a first ambient factor is available. If yes, go to step 302; otherwise, go to step 304.

Step 302: Measure a second ambient factor.

Step 303: Check if the difference between the first ambient factor and the second ambient factor exceeds a threshold. If yes, go to step 304; otherwise, go to step 308.

Step 304: Poll for potential connection.

Step 305: Check if there is a response from a transponder. If yes, go to step 306; otherwise, go to step 307.

Step 306: Inform the wireless communications device that a card is detected.

Step 307: Measure the first ambient factor.

Step 308: End.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A proximity sensing method employed by a wireless communications device, comprising:
   performing a first predetermined operation to detect presence of at least a transponder in the proximity of the wireless communications device;
   when the presence of a transponder in the proximity of the wireless communications device is not detected by the first predetermined operation, performing a second predetermined operation to obtain a first characteristic value and after a period of time, performing the second predetermined operation to obtain a second characteristic value sequentially;
   checking if the first characteristic value and the second characteristic value satisfy a predetermined criterion; and
   when the predetermined criterion is satisfied, performing the first predetermined operation again to check the presence of the transponder in the proximity of the wireless communications device.

2. The proximity sensing method of claim 1, wherein the first predetermined operation is a polling operation for a connection establishment.

3. The proximity sensing method of claim 1, wherein the second predetermined operation transmits a probe signal to an antenna matching network of the wireless communications device, receives a loopback signal of the probe signal, and obtains a characteristic value according to the loopback signal, where the first characteristic value and the second characteristic value are characteristic values obtained by the second predetermined operation at different times.

4. The proximity sensing method of claim 3, wherein the probe signal is a single-tone signal, a square wave signal, an arbitrary signal, a triangular signal or a white noise signal.

5. The proximity sensing method of claim 3, wherein the probe signal is transmitted based on a first local oscillator (LO) frequency, and the loopback signal is received based on a second LO frequency different from the first LO frequency.

6. The proximity sensing method of claim 1, wherein the predetermined criterion is satisfied when a difference between the first characteristic value and the second characteristic value exceeds a threshold.

7. The proximity sensing method of claim 1, further comprising:
 after performing the second predetermined operation to obtain the first characteristic value, the wireless communications device enters into a sleep mode, and then leaves the sleep mode after the period of time in order to perform the second predetermined operation to obtain the second characteristic value.

8. The proximity sensing method of claim 1, further comprising:
 when the first predetermined operation is performed again and the presence of a transponder in the proximity of the wireless communications device is not detected, performing the second predetermined operation to update the first characteristic value.

9. The proximity sensing method of claim 1, wherein the wireless communications device is a near field communications device.

10. A wireless communications device having proximity sensing capability, comprising:
 a first circuit, for performing a first predetermined operation to detect a presence of at least a transponder in the proximity of the wireless communications device, and when the presence of a transponder in the proximity of the wireless communications device is not detected by the first predetermined operation, performing a second predetermined operation to obtain a first characteristic value and after a period of time, performing the second predetermined operation to obtain a second characteristic value sequentially; and
 a second circuit, for checking if the first characteristic value and the second characteristic value satisfy a predetermined criteria;
 wherein when the predetermined criterion is satisfied, the first circuit performs the first predetermined operation again to check the presence of the transponder in the proximity of the wireless communications device.

11. The wireless communications device of claim 10, wherein the first predetermined operation is a polling operation for a connection establishment.

12. The wireless communications device of claim 10, wherein the first circuit comprises:
 a transmitter, for transmitting a polling command signal when performing the first predetermined operation, and transmitting a probe signal to an antenna matching network of the wireless communications device when performing the second predetermined operation; and
 a receiver, for receiving a response signal of the polling command signal when performing the first predetermined operation, and receiving a loopback signal of the probe signal and accordingly obtaining a characteristic value according to the loopback signal when performing the second predetermined operation, where the first characteristic value and the second characteristic value are characteristic values obtained by the second predetermined operation at different times;
 wherein the second predetermined operation transmits the probe signal, receives the loopback signal of the probe signal, and obtains a characteristic value according to the loopback signal.

13. The wireless communications device of claim 12, wherein the probe signal is a single-tone signal, a square wave signal, an arbitrary signal, a triangular signal or a white noise signal.

14. The wireless communications device of claim 12, further comprising
 a first local oscillator, for generating a first local oscillation frequency such that the transmitter transmits the probe signal on the first local oscillator frequency; and
 a second local oscillator, for generating a second local oscillation frequency such that the receiver receives the loopback signal on the second LO frequency;
 wherein the first local oscillator frequency is different from the second local oscillator frequency.

15. The wireless communications device of claim 11, wherein the second circuit determines the predetermined criterion is satisfied when a difference between the first characteristic value and the second characteristic value exceeds a threshold.

16. The wireless communications device of claim 11, wherein after performing the second predetermined operation to obtain the first characteristic value, the second circuit controls the wireless communications device to enter into a sleep mode, and then leaves the sleep mode after the period of time in order to perform the second predetermined operation to obtain the second characteristic value.

17. The wireless communications device of claim 11, wherein when the first circuit performs the first predetermined operation again and the presence of a transponder in the proximity of the wireless communications device is not detected, the first circuit performs the second predetermined operation to update the first characteristic value.

18. The wireless communications device of claim 11, wherein the wireless communications device is a near field communications device.

* * * * *